US008392353B2

(12) United States Patent
Cho et al.

(10) Patent No.: US 8,392,353 B2
(45) Date of Patent: Mar. 5, 2013

(54) COMPUTERIZED KNOWLEDGE REPRESENTATION SYSTEM WITH FLEXIBLE USER ENTRY FIELDS

(75) Inventors: Raymond J. Cho, San Mateo, CA (US);
Richard O. Chen, Cupertino, CA (US);
Ramon M. Felciano, San Francisco, CA (US); Daniel R. Richards, Palo Alto, CA (US)

(73) Assignee: Ingenuity Systems Inc., Redwood City, CA (US)

(*) Notice: Subject to any disclaimer, the term of this patent is extended or adjusted under 35 U.S.C. 154(b) by 701 days.

(21) Appl. No.: 12/499,761

(22) Filed: Jul. 8, 2009

(65) Prior Publication Data

US 2010/0010957 A1    Jan. 14, 2010

Related U.S. Application Data

(60) Division of application No. 10/770,864, filed on Feb. 2, 2004, now Pat. No. 7,577,683, which is a continuation-in-part of application No. 09/733,495, filed on Dec. 8, 2000, now Pat. No. 6,772,160, and a continuation-in-part of application No. 10/038,197, filed on Nov. 9, 2001, now Pat. No. 6,741,986.

(Continued)

(51) Int. Cl.
*G06F 17/00* (2006.01)
*G06N 5/04* (2006.01)
(52) U.S. Cl. ........................................... 706/60
(58) Field of Classification Search .................. 706/60
See application file for complete search history.

(56) References Cited

U.S. PATENT DOCUMENTS

| 5,317,507 | A | | 5/1994 | Gallant |
| 5,371,807 | A | | 12/1994 | Register et al. |
| 5,377,103 | A | | 12/1994 | Lamberti et al. |
| 5,398,183 | A | * | 3/1995 | Elliott .......................... 600/509 |
| 5,418,971 | A | | 5/1995 | Carison |

(Continued)

FOREIGN PATENT DOCUMENTS

| EP | 1158447 A1 | 11/2001 |
| GB | 2350712 A | 12/2000 |

(Continued)

OTHER PUBLICATIONS

'Object oriented design and programming with C++': Leach, 1995, AP Professional, ISBN 0-12-440215-1.*

(Continued)

*Primary Examiner* — Kakali Chaki
*Assistant Examiner* — Peter Coughlan
(74) *Attorney, Agent, or Firm* — Wilson Sonsini Goodrich & Rosati (57) ABSTRACT

Methods for constructing and maintaining knowledge representation systems (KRS) are disclosed. The KRS is initially organized and populated using knowledge engineers. After initial organization, scientific domain experts digest and structure source texts for direct entry into the KRS using templates. These templates constrain both the form and content of the digested information, allowing it to be entered directly into the KRS. The methods disclosed herein permit the construction and maintenance of a much larger KRS than could be constructed and maintained using known methods. Fact type specific fact templates are completed, accepting predefined fact types found in predetermined information sources. Fact template may comprise a user interface that constrains user entry to one of a predetermined set of valid entries. The user interface may include a user field that permits entry of new information not included in the predetermined set of valid user entries.

10 Claims, 5 Drawing Sheets

Related U.S. Application Data (60) Provisional application No. 60/210,898, filed on Jun. 8, 2000, provisional application No. 60/229,582, filed on Aug. 31, 2000, provisional application No. 60/229,581, filed on Aug. 31, 2000, provisional application No. 60/229,424, filed on Aug. 31, 2000, provisional application No. 60/229,392, filed on Aug. 31, 2000.

(56) References Cited

U.S. PATENT DOCUMENTS

| | | | |
|---|---|---|---|
| 5,625,721 | A | 4/1997 | Lopresti et al. |
| 5,625,814 | A * | 4/1997 | Luciw .......................... 707/763 |
| 5,794,050 | A | 8/1998 | Dahlgren et al. |
| 5,963,966 | A | 10/1999 | Mitchell et al. |
| 5,976,842 | A | 11/1999 | Wurst |
| 6,023,659 | A | 2/2000 | Seilhamer et al. |
| 6,038,560 | A | 3/2000 | Wical |
| 6,052,714 | A | 4/2000 | Miike et al. |
| 6,067,548 | A | 5/2000 | Cheng |
| 6,101,488 | A | 8/2000 | Hayashi et al. |
| 6,115,640 | A | 9/2000 | Tarumi |
| 6,154,737 | A | 11/2000 | Inaba et al. |
| 6,226,377 | B1 | 5/2001 | Donaghue |
| 6,236,987 | B1 | 5/2001 | Horowitz et al. |
| 6,263,335 | B1 | 7/2001 | Paik et al. |
| 6,292,796 | B1 | 9/2001 | Drucker et al. |
| 6,308,170 | B1 | 10/2001 | Balaban |
| 6,345,235 | B1 | 2/2002 | Edgecombe et al. |
| 6,370,542 | B1 | 4/2002 | Kenyon |
| 6,424,980 | B1 | 7/2002 | Iizuka et al. |
| 6,442,566 | B1 | 8/2002 | Atman et al. |
| 6,470,277 | B1 | 10/2002 | Chin et al. |
| 6,487,545 | B1 | 11/2002 | Wical |
| 6,498,795 | B1 | 12/2002 | Zhang et al. |
| 6,554,705 | B1 | 4/2003 | Cumbers |
| 6,598,043 | B1 | 7/2003 | Baclawski |
| 6,741,976 | B1 | 5/2004 | Tuzhilin |
| 6,741,986 | B2 | 5/2004 | Cho et al. |
| 6,772,160 | B2 | 8/2004 | Cho et al. |
| 6,904,423 | B1 | 6/2005 | Nicolaou et al. |
| 7,022,905 | B1 | 4/2006 | Hinman et al. |
| 2001/0049671 | A1 | 12/2001 | Joerg |
| 2002/0165737 | A1 | 11/2002 | Mahran |
| 2002/0194201 | A1 | 12/2002 | Wilbanks et al. |
| 2003/0018522 | A1 | 1/2003 | Denimarck et al. |
| 2004/0220969 | A1 | 11/2004 | Cho et al. |
| 2004/0236740 | A1 | 11/2004 | Cho et al. |
| 2004/0249620 | A1 | 12/2004 | Chandra et al. |
| 2005/0044071 | A1 | 2/2005 | Cho et al. |
| 2005/0055347 | A9 | 3/2005 | Cho et al. |
| 2006/0036368 | A1 | 2/2006 | Chen et al. |
| 2006/0064037 | A1 | 3/2006 | Shalon et al. |
| 2006/0143082 | A1 | 6/2006 | Ebert |
| 2007/0178473 | A1 | 8/2007 | Chen et al. |
| 2007/0282632 | A1 | 12/2007 | Sachs |
| 2008/0033819 | A1 | 2/2008 | Leschly |
| 2008/0255877 | A1 | 10/2008 | Fernandez |
| 2011/0191286 | A1 | 8/2011 | Cho et al. |

FOREIGN PATENT DOCUMENTS

| | | |
|---|---|---|
| JP | 11-259498 | 9/1999 |
| JP | 2001-134600 | 5/2001 |
| WO | WO 01/55911 A1 | 8/2001 |
| WO | WO 02/099725 A1 | 12/2002 |

OTHER PUBLICATIONS

'An object oriented and constraint based knowledge representation system for design object modeling': Yokoyama, 1990, IEEE, CH2842-3, pp. 146-152.*
Hirota, et al. Evaluation of ontology-driven information extraction. The Association for Natural Language Processing. Proceeding of the Sixth Annual Meeting of the Association for Natural Language Processing. Mar. 7, 2000; 137-138. (in Japanese with English translation).
Ashburner, et al. Gene ontology: tool for the unification of biology. The Gene Ontology Consortium. Nat Genet. May 2000;25(1):25-9.
Ayumi Inoue. GenomeNet as a medical information resource. Gene & Medicine. Japan. Medicaldo Co. Ltd. Aug. 10, 2000; 4(3):16-23 (in Japanese with English abstract).
Ayumi Inoue. GenomeNet as a medical information resource. Gene & Medicine. Japan. Medicaldo Co. Ltd. Aug. 10, 2000; 4(3):16-23 (in Japanese, partially translated in English).
Bura, et al. The Binary Regression Quantile Plot: Assessing the Importance of Predictors in Binary Regression Visually. Biometrical Journal. 2001;43(1):5-21.
Goble, et al. Transparent Access to Multiple Bioinformatics Information Sources, XP-001116348, IBM Systems Journal, 2001, pp. 532-551, vol. 40, No. 2, IBM Corp. Armonk, New York.
Hughes, et al. Functional discovery via a compendium of expression profiles. Cell. Jul. 7, 2000;102(1):109-26.
International search report Aug. 27, 2008 for PCT Application No. US2007/74663.
International search report dated Jan. 10, 2003 for PCT Application No. US02/35650.
International search report dated Jul. 22, 2004 for PCT Application No. US03/03006.
Jacques Van Helden, et al. Representing and Analysing Molecular and Cellular Function Using the Computer, Biol. Chem,XP008032491, Sep./Oct. 2000, vol. 381, pp. 921-935, Walter de Gruyter, Berlin & New York.
Karp, et al. Integrated pathway-genome databases and their role in drug discovery, Trends in Biotechnology, XP004169726, Jul. 1999, pp. 275-281, vol. 17, Elsevier Science.
Meltzer, P.S. Spotting the target: microarrays for disease gene discovery. Curr Opin Genet Dev. Jun. 2001;11(3):258-63.
Noy, et al. The knowledge model of protege 2000: Combining interoperability and flexibility. Springer. 2000; 17-32.
Oliver, et al., Ontology Development for a Pharmacogenetics Knowledge Base, Stanford Medical Informatics, Stanford University of Medicine, Jan. 23, 2002, pp. 65-76, XP002287419, Retrieved from Internet: URL:http://helix-web.stanford.edu/psb02/oliver.pdf.
Qu, et al. Multidimensional Data Integration and Relationship Inference. Intelligent Systems in Biology (online). Rigel Pharmaceuticals. 2002: 21-27.
Rzhetsky, et al. A Knowledge Model for Analysis and Simulation of Regulatory networks in Bioinformatics Studied Aiming at Disease Gene Discovery, AMIA 99 Fall Annual Symposium, PP1-5, XP002287421, Retrieved from the Internet: URL:http://www.amia.org/pubs/proceedings/symposia/1999/D005314.pdf.
Rzhetsky, et al. A knowledge model for analysis and simulation of regulatory networks. Bioinformatics. Dec. 2000;16(12):1120-8.
Toshiaki Katayama. Modeling of intermolecular interaction network, simulation. Japan. Japan Technical Information Services Corporation (JATIS). Jun. 15, 2001; 20(2):12-15 (in Japanese, partially translated in English).
Toshiaki Katayama. Modeling of intermolecular interaction network, simulation. Japan. Japan Technical Information Services Corporation (JATIS). Jun. 15, 2001; 20(2):12-15 (in Japanese with English abstract).
Wataru Fujibuchi. Gene & genome encyclopedia. Gene & Medicine. Japan. Medicaldo Co. Ltd. Oct. 1, 1997; 1(2):119-124 (in Japanese, partially translated in English).
Wataru Fujibuchi. Gene & genome encyclopedia. Gene & Medicine. Japan. Medicaldo Co. Ltd. Oct. 1, 1997; 1(2):119-124 (in Japanese with English abstract).
Blaschke, C., et al. 1999. Automatic extraction of biological information from scientific text: protein-protein interactions. Proc Int Conf Intell Syst Mol Biol. 60-7.
Business Week. GM finally has a real winner. But success is bringing a fresh batch of problem. McGraw-Hill Co. Inc. Aug. 17, 1992.
Chakkour, et al. Sentence Analysis by Case-Based Reasoning. The Fourteenth International Conference on Industrial and Engineering Applications of Artificial Intelligence and Expert SystemsIEA/AIE 2070. 2001; 546-551.
Chaudhri, et al. 1998. OKBC: A programmatic foundation for knowledge base interoperability. In Proceedings of the 1998 National Conference on Artificial Intelligence.

Farquhar, et al. May 14, 1997. The ontolingua server: a tool for collaborative ontology construction. Stanford University. pp. 1-22.

Hafner, et al. Ontological Foundations for Biology Knowledge Models. 4th International Conference. on Intelligent Systems for Molecular Biology, Jun. 12-15, 1996 at Washington University in St. Louis, Missouri.

Halpin, T. Object-role modeling (ORM/NIAM). Handbook on Architectures of Information Systems. Ch. 4. 1998.

Karp, et al. 2000. HinCyc: A knowledge base of the complete genome and metabolic pathways of *H. influenzae*. Proc Int Conf Intell Syst Mol Biol. 4: 116-24.

Newswire Association Inc. On-line Tests Give Instant Feedback on Office Skills. Feb. 14, 1998.

Rindflesch, et al. Extracting molecular binding relationships from biomedical text. Presented May 2, 2000 at the Sixth Applied Natural Language Processing Conference from Apr. 29-May 5, 2000 in Seattle, Washington.

Sekimizu, et al. 1998. Identifying the Interaction Between Genes and Gene Products Based on Frequently Seen Verbs in Medline Abstracts. Genome Inform Ser Workshop Genome Inform. 9: 62-71.

Supplementary European Search Report dated Sep. 21, 2007 re Appln. No. 02778752.2.

Thomas, et al. 2000. Automatic Extraction of Protein Interactions from Scientific Abstracts. Pacific Symposium on Biocomputing. 541-52.

Office action dated Jan. 13, 2010 for U.S. Appl. No. 10/502,420.
Office action dated Feb. 2, 2011 for U.S. Appl. No. 11/829,784.
Office action dated May 20, 2009 for U.S. Appl. No. 10/502,420.
Office action dated Jun. 9, 2009 for U.S. Appl. No. 11/829,784.
Office action dated Jun. 10, 2009 for U.S. Appl. No. 10/632,099.
Office action dated Jun. 16, 2010 for U.S. Appl. No. 11/829,784.
Office action dated Jul. 1, 2011 for U.S. Appl. No. 10/502,420.
Office action dated Jul. 2, 2010 for U.S. Appl. No. 10/632,099.
Office action dated Sep. 4, 2008 for U.S. Appl. No. 11/829,784.
Office action dated Sep. 8, 2010 for U.S. Appl. No. 10/502,420.
Office action dated Sep. 18, 2008 for U.S. Appl. No. 10/632,099.
Office action dated Nov. 14, 2011 for U.S. Appl. No. 10/632,099.
Office action dated Nov. 19, 2007 for U.S. Appl. No. 10/632,099.
Office action dated Dec. 30, 2010 for U.S. Appl. No. 10/632,099.

* cited by examiner

FIG. 2a

TRF2$^{\Delta B \Delta M}$ Induces Chromosome End Fusions

Microscopic analysis of DAPI-stained cells expressing TRF2$^{\Delta B \Delta M}$ revealed the frequent occurrence of anaphase bridges and lagging chromosomes (Figure 4A). This phenotype was not observed after induction of control cells not expressing TRF2 proteins or in cells induced for full-length TRF2 or TRF2$^{\Delta B}$ (Figure 4B, and data not shown). ⟶60

FIG. 2b

Fact I: Mutant Trf2$^{\Delta B \Delta M}$, compared to wildtype Trf2, leads to increased chromosome end fusions. ⟶71

Fact Data  ⟶73
Effector: Trf2$^{\Delta B \Delta M}$ expression
Control: as compared to Trf2$^{\Delta B}$ expression
Direction of change: Increases
Process property: Frequency of
Process: End fusion
Input: (of) Chromosomes Meta Data  ⟶75
Experimental Type: Plasmid transient transfection
Visualization Method: DAPI staining

FIG. 3

FIG. 4 choose a fact type

Fact Type | Template  ⟋—111
1. Case-Control | Protein ▾ causes changes to a | Template 1
 | Cellular_Process ▾

FIG. 5

Fact Data
- Protein +
- direction_of_change
- property_of
- cellular_process+
- control +

Back  Go

Object
Object: ▾   new  instances

- Fas mouse (mus)protein
- Fas protein
- Fasl mouse (mus)protein

Object1:fas_mus_protein
Get Details ◄—151 has_structural_motif_remaining:
▾ has_mutation:
▾ has_property:

consensus_amino_acid_sequence:

has_stage:
▾ has_physical_location:
293 cell line part_of_anatomy:

has_structural_motif:
▾

COMPUTERIZED KNOWLEDGE REPRESENTATION SYSTEM WITH FLEXIBLE USER ENTRY FIELDS

REFERENCE TO RELATED APPLICATIONS

This application is a divisional application and claims the benefit of priority under 35 USC §121 of U.S. patent application Ser. No. 10/770,864, filed on Feb. 2, 2004 now U.S. Pat. No. 7,577,683, which is a continuation-in-part of and claims the benefit of priority under 35 USC §120 of U.S. patent application Ser. No. 09/733,495, filed on Dec. 8, 2000, now issued as U.S. Pat. No. 6,772,160 on Aug. 3, 2004 and U.S. patent application Ser. No. 10/038,197, filed on Nov. 9, 2001, now issued as U.S. Pat. No. 6,741,986 on May 25, 2004; and further claims the benefit of priority under 35 USC §119(e) to U.S. Provisional Applications Ser. Nos. 60/210,898, filed Jun. 8, 2000; 60/229,582, filed Aug. 31, 2000; 60/229,581, filed Aug. 31, 2000; 60/229,424, filed Aug. 31, 2000; and 60/229,392, filed Aug. 31, 2000, which are incorporated herein by reference in their entirety.

BACKGROUND

The explosion of published information in the fields of biology, biochemistry, genetics and related fields (collectively referred to herein as "genomics") presents research scientists with the enormous challenge of searching and analyzing a massive amount of published information to find the particular information of interest. The majority of new genomics information is produced and stored in text form. Information stored in text form is unstructured and, other than key word searches of various types, relatively inaccessible to standard computer search techniques.

The process of culling and reviewing relevant information from the published literature is consequently a laborious and time-consuming one. Even the most basic queries about the function of a particular gene using even sophisticated key word searches often result in generating too many articles to be reviewed carefully in a reasonable amount of time, missing critical articles with important findings expressed in a non-standard manner and form or both.

Text storage was never designed for and has not proven adequate to the task of describing and clarifying the complex, interrelated biochemical pathways involved in biological systems. Examples of high-level computational tasks that cannot be performed on text-based databases include: a) computational identification of clusters of diverse functionally interrelated genes that occur in genomic data sets; b) systematic, principled prediction of gene function using computation over links between uncharacterized genes and other genes in the genome, using all functional relationships available in the literature rather than just the available experimental genomic data sets; c) novel biological inferences in the knowledge base, based on computation over large bodies of existing, explicitly entered content; and d) flexible computation of the genes that constitute biological pathways, based on criteria such as upstream versus downstream genes, transcriptional versus phosphorylation targets, membrane-bound versus nuclear genes, etc.

By limiting a researcher's ability to ask these types of questions when searching for information, the current text-based model of information storage is a serious obstacle to research in genomics. The ever-increasing volume of functional genetic data resulting from the biotechnology revolution further demonstrates how both the academic and industrial communities require a more readily computable means for archiving and mining the genomics information.

The desirability of placing the published genomics information into a structured format and thus allowing easier and more useful searches is known, for example by storing information extracted from text in a frame-based knowledge representation system. Although examples of frame-based knowledge representation systems are known in several fields, the difficulties in populating such a system with specific genomics information, leading to the creation of a true genomics knowledge base are substantial.

The process to populate a frame-based knowledge representation system (herein "KRS") with information, leading to the creation of what is called a "knowledge base," ("KB") is known as knowledge acquisition (KA). KA is recognized as a slow, difficult and expensive process. KA is a major and perhaps the major bottleneck in building functional and useful KBs. A consequence of the difficulties associated with KA is that most KBs are small and concentrate on a very limited domain of interest.

Known methods of performing the KA function require a knowledge representation expert or knowledge engineer (KE) with computer science training to work with the appropriate domain experts to manually capture and then organize the extracted information into the KRS. The KE transcribes, structures and embeds this information into the KB. KEs must have an understanding of the underlying formal machine representation of the KRS in order to extract the information from the text source and then insert the information into the KRS in a consistent, accurate and appropriate manner. Often the KE works closely with scientific experts to classify and categorize the information properly. The need for two highly trained individuals to work together to structure and enter the information makes this approach to populating a KRS extremely time consuming and expensive. These problems also greatly restrict the extent to which this process can be used as the amount of information to be captured increases.

As millions of findings must be captured and structured to create a KB of the size and scope necessary for useful genomics research, a method for efficiently and economically populating a genomics KRS with structured, codified information to create a usable KB is needed.

SUMMARY

Various embodiments provide a web-accessible, KRS-based KA system, enabling all interested biological scientists ("scientists"), with no specific training in knowledge modeling or computer science, to extract information without direct interaction with KEs. By enabling a distributed group of scientists to populate the KRS, without requiring these scientists to understand the details of the KRS's structure or implementation, potentially hundreds of scientists can be employed on a consultant basis for the KA task. This permits the population of the KRS at a rate that is tens to hundreds of times faster than the known use of in-house KEs to populate a KRS, at a fraction of the cost. Various embodiments allow for the disassociation of the knowledge engineering and knowledge acquisition processes.

To enable KA according to some embodiments involves factors such as a) the acquisition and structuring of the captured knowledge in a form strictly consistent with the KRS; and b) a KA process usable by a widely distributed group of scientists.

The first requirement can be met by the use of KA fact templates. These templates are the entry point for information taken from various sources and comprise a logical series of text boxes with pull-down menu selections. The content and configuration of these fact templates is driven by and directly linked to the content and fact model structure of the overall KRS. The templates are constructed to capture all fact types, relationships, objects and processes, as well as all associated details of these concepts contained in the KRS.

As new concepts and terms not originally represented in the KRS will certainly be found in the future, provisions can be made to allow entry into the template of new information types. The entry of such new information causes the template to be flagged for examination by one of a small group of KEs. Upon examination, and as appropriate, the KRS will be modified and the new finding or term entered into it. The templates can then be modified or additions made to their pull-down menus to accommodate the changes.

The training tools for teaching the scientists how to complete the templates are available through a web site. After studying the web-accessible training modules, a scientist takes a web-accessible certification test, the successful completion of which is generally necessary for the scientist to submit completed templates for entry into the KRS. The scientist who submits completed templates is designated as a content scientist.

As part of an on-going and necessary quality control process, some or all completed templates are reviewed by quality control scientists. These quality control scientists typically have qualified for the quality control role by either additional training or exemplary performance at the entry-level knowledge entry position. For content scientists who have reached a certain skill level, every template need not be reviewed by a quality control scientist.

The templates, trained scientists, and quality control personnel permit the rapid population of the KRS with verified findings. The resulting KB can be maintained and expanded at a rate much greater than that allowed by known methods for populating other KRSs.

Some embodiments are described in detail, with reference to the figures listed and described below.

DETAILED DESCRIPTION

A first embodiment comprises a method for deconstructing experimental findings originally occurring in narrative text or symbolic (e.g., graphical or tabular) documents, structuring and codifying these findings by means of templates and then storing the information contained in the completed templates in a KRS to create a KB.

The data architecture used in this embodiment is herein referred to as an ontology. An ontology is a hierarchical representation of the taxonomy and formal concepts and relationships relevant to the domain of interest stored in a knowledge representation system ("KRS"). In short, an ontology is a specific form of a KRS. The KRS may be a frame-based, rule-based or other type of database architecture, the choice of which may depend on a variety of factors, such as storage needs. In one embodiment, a frame-based KRS is used. Therefore, for purposes of describing the KRS of one embodiment, reference will be made to a frame-based KRS. However, it should be understood that other known types of data architecture may alternatively be used in connection with some embodiments, as will become apparent. In a first embodiment, the domain of interest is genomic information, which comprises at a minimum information relating to genes, their DNA sequences, the proteins which result when the genes are expressed, the biological effects of the expressed proteins and other, related information. Using an ontology allows searching to find relationships between and inferences about the items stored in the KB.

In order to accomplish these goals, the ontology must be formally defined and organized. The primary organizational component of the ontology in a frame-based KRS is the class. Classes are descriptions of particular categories of objects. Properties are attributes that describe the class itself or relate one class to another. An instance is an actual example of a class, and the relationship between two different instances in the ontology is defined by slots. Slots can be thought of as the verbs that relate and link two classes. Once information is represented in this manner, frame-based KRSs support basic inference capabilities such as classification and declarations of axioms. Axioms impose semantic constraints on the ontology that help to maintain the consistency and integrity of the data. Frame-based KRSs also provide basic query capabilities for retrieving stored data. Populating the frame-based KRS with real world examples of experimental information transforms the system into a KB.

Figure 1:
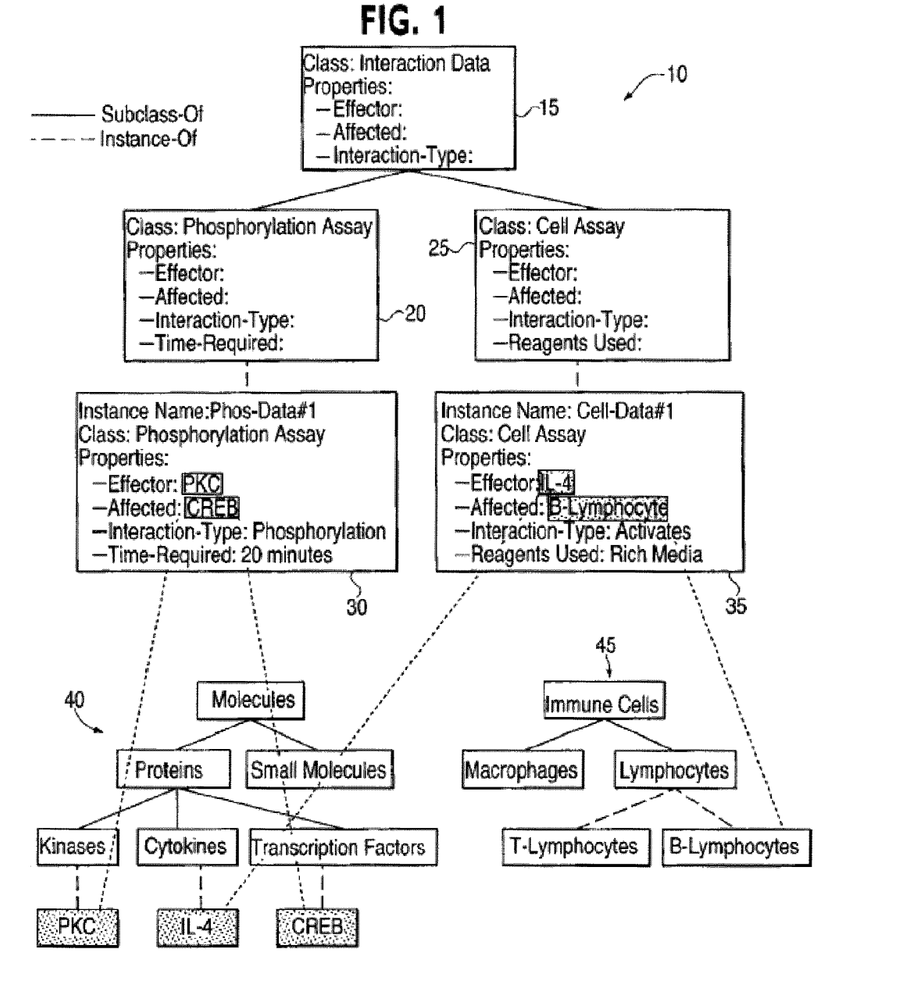
FIG. 1 illustrates an example ontology.

FIG. 1 is a diagram of a portion of an ontology, illustrating the concepts of classes, properties and instances, as well as examples of experimental information that reside in the KB described herein. As shown in FIG. 1, ontology 10 has three sub-parts 15, 20 and 25. Sub-part 15 belongs to the class of interaction data and has three properties: effector, affected, and interaction type. Below sub-part 15 are sub-parts 20 and 25, respectively having the classes of phosphorylation assay and cell assay. Sub-parts 20 and 25 are both sub-classes of the class interaction data. Each sub-class inherits all the properties of its parent class. In the case of sub-class phosphorylation assay 20, an additional property of time-required is added. For the sub-class cell assay 25, the additional property added is reagents-used. Each sub-class shown in sub-parts 20 and 25 is shown linked to one instance of the respective subclass. Instance 30 is an instance of subclass 20 and instance 35 is an instance of subclass 25. The particular properties for instances 30 and 35 are filled in with actual values. Some of these values are examples of biological entities categorized and captured in other parts of the ontology. The effector PKC in instance 30 is an instance of a kinase, while the affected CREB is a transcription factor. Both the effector and affected are within the class of molecules and the subclass of proteins, as shown in molecule sub-ontology 40. In a similar fashion, in instance 35, the effector is IL-4, which is a member of the class cytokines, shown in sub-ontology 40, and the affected, B-Lymphocyte, is a lymphocytes in immune cells sub-ontology 45. The fact that the same object can belong to several different classes explains why searching across the KB can generate results that are not readily apparent from the individual items entered into it. Note that the illustrated ontology represents only a very small portion of the ontology that will be constructed using the methods of this first embodiment described herein.

The KB of various embodiments requires translating information from source text (e.g., information expressed in a natural language, such as English) and/or symbolic data (e.g., graphical or tabular data) into a computational information language. In the example used herein, the information is biological information, although it will be apparent to one skilled in the art that other types of information could be stored in a KB.

For purposes of this description, the process of translating information is called structuring knowledge, as it places knowledge, in this case biological findings, into the structure and architecture of the KRS. The method for structuring the knowledge is based on formalized models of experimental design and biological concepts. These models provide the framework for capturing a considerable portion of the loosely articulated findings typically found in academic literature. The specific level of experimental results that is of greatest value to industrial and academic scientists can be particularly targeted for capture. So, for example, in the field of genomics, knowledge that focuses on the effects that both perturbation to genes, gene products (RNA and proteins) and small molecules and various physical stimuli have upon biological systems is singled out. These perturbations and stimuli form the backbone of the KRS and provide the necessary framework for developing a more sophisticated representation of complex biological information.

Examples of the types of facts and biological relationships that can be translated into the KRS are: a) an increase in the amount of Fadd protein increases apoptosis; b) a decrease in Raf levels increases activation of Rip2; and c) the allele delta32 of CCR5, compared to the wild-type allele, decreases HIV transmission.

In one embodiment, biological systems are defined in terms of processes and objects. Discrete objects are physical things such as specific genes, proteins, cells and organisms. Processes are actions that act on those objects. Examples of processes include phosphorylation, which acts on discrete objects such as proteins, and apoptosis, which acts on cells. Perturbation of an object can have an effect on a process or on an object. Using these concepts of objects and processes, the information in the KB may be represented by a variety of fact types. In one embodiment, two distinct fact types of interest are: a) case-control facts; and b) observational facts.

A case-control fact describes those experimental results wherein a discrete object, such as a protein or a drug, or a specific physical stimulus, such as hypoxia, is added to a biological or biochemical system and the corresponding changes in the system are monitored and measured. An example of a case-control fact is, "expression of hRas from a viral vector increases the phosphorylation of MAPK in 293 cells."

An observational fact reports an observation, not the alteration of a biological system by an effector. An example of an observational fact is, "examination of cells using laser scanning confocal microscopy revealed that Bcl-2 localizes to the mitochondria of 293 cells."

In order to construct the KRS, each of these building blocks-objects, processes and experimental fact types, has been rigorously defined and characterized. Additionally, the KRS is able to store the appropriate details associated with all the processes (including process properties, modifiers and mediators), objects (including mutations, allele names and physical location). Capturing these details and creating varying levels of abstraction are necessary if the populated KB is to reflect the dynamic, complex and interconnected nature of biological findings.

Figure 2A:
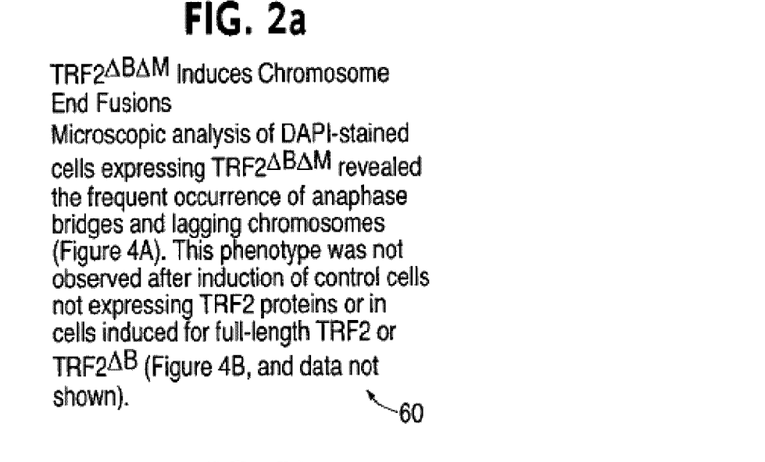
FIGS. 2a and 2b show, respectively, an example of a fact as it appears in the literature and a fact after it has been abstracted.
Figure 2B:
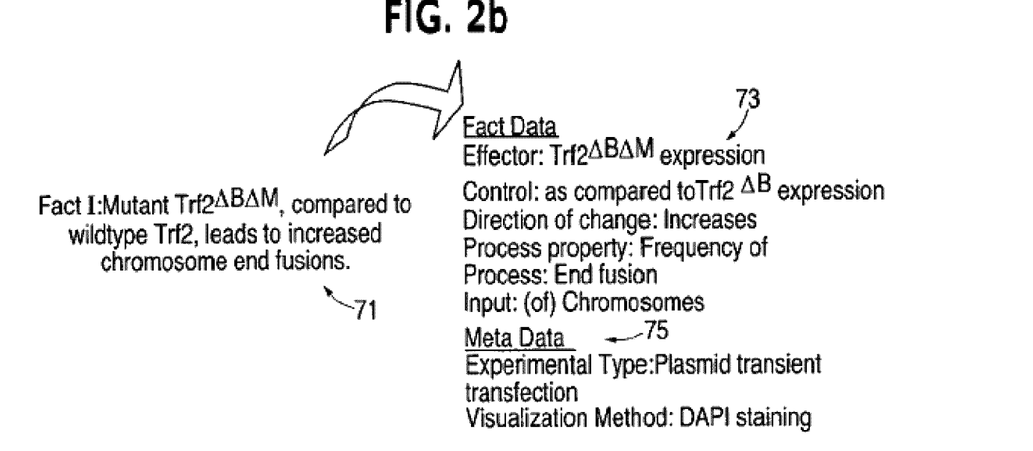

FIGS. 2a and 2b illustrate how fact model types can be used to deconstruct the semantics of text-based information into its proper constituent components and then model and structure those components. In general, information to be extracted may exist in a text-based format, graphical form, or a combination of text and graphics. Typically, information is presented in both text and graphical form in a research article in the peer-reviewed literature. In the example illustrated in FIG. 2a, a text paragraph 60 represents an experimental finding indicating that expression of a mutant form of the human protein Trf2 leads to increased frequency of chromosome end fusions, anaphase bridges and lagging chromosomes. As shown in FIG. 2b, the fact of FIG. 2a has been deconstructed. The fact is displayed at the left of the figure in colloquial form 71. Explicit semantic representation 73 of the fact is shown on the right of FIG. 2b. Metadata 75 presents information related to the experiment from which the fact was derived. In this example, the metadata includes the type of experiment and the method used to visualize the experiment's results.

In order to maintain consistency in the deconstruction of the text-based (or symbolic) information and to insure that knowledge is acquired and structured in a manner strictly consistent with the KRS, fact templates have been designed and implemented. These templates are the tools used by scientists to take information extracted from source text, graphics, or a combination thereof, and to format that information so that it can be entered in the KRS. The templates may be accessible over the web and comprise a logical series of text boxes, with pull-down menus assigned to each text box. The content and configuration of these fact templates is driven by the content and fact model structure of the KRS. The templates are constructed to capture all fact types, relationships, objects and processes, as well as all associated details of these concepts, contained in the KRS. A scientist entering data into the templates cannot enter terms not contained in the KRS unless these new terms are marked as new and reviewed in the manner described below.

Figure 3:
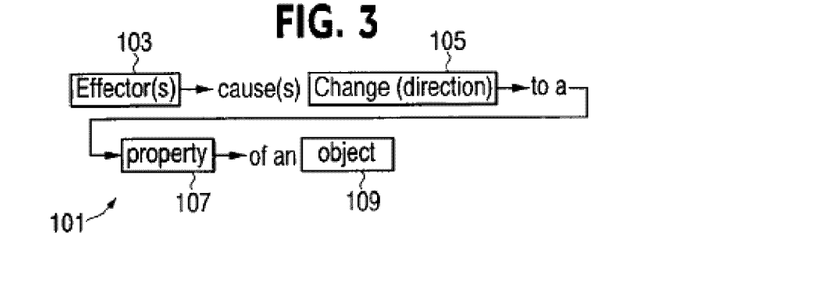
FIG. 3 is a flow chart of one type of fact captured by the templates.

In the field of biological information, the first step in the process of knowledge entry is deciding on the type of fact being expressed by the information. For example, in one embodiment one needs to decide whether the fact is a case control fact or an observational type fact. The following example illustrates how a typical case control fact would be entered into a template and then stored in the KRS. FIG. 3 shows the flow structure depicting the deconstruction and modeling of a simplified case control fact into its constituent components for entry into the KRS. As shown in FIG. 3, case control fact 101 comprises an effector 103 which causes a change of direction 105 to a property 107 of an object 109.

A specific example of a case control fact, "... in 293 cells, transient overexpression of mouse (mus) Fas induced apoptosis in a dose-dependent manner," has an effector (the protein Fas) which causes a change (induction) of a property (apoptosis) in an object (293 cells). These components of a case control fact are correspondingly represented and modeled by the appropriate template with the appropriate pull-down menus.

Figure 4:
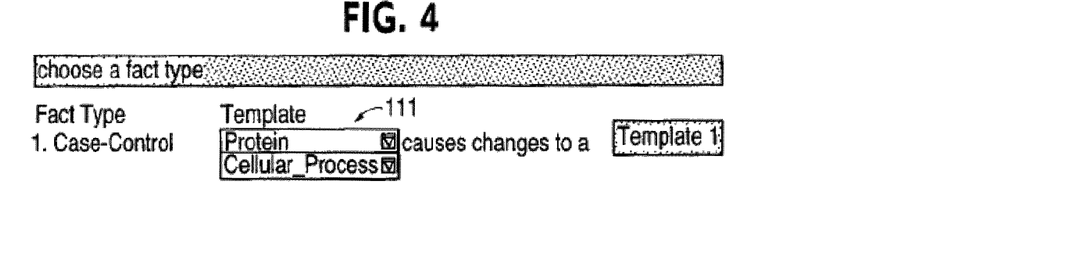
FIG. 4 illustrates a first selection menu for entry of the fact type shown in FIG. 3.

In this example, the scientist would first call up the case control template. FIG. 4 illustrates how the appropriate case control template would initially appear to the scientist. After choosing the case control template, the image shown in FIG. 4 is displayed. As the template displays a menu box 111 for protein and cellular process, the scientist knows that the correct template has been chosen for this particular example, as a protein effector Fas has been shown to cause a change in a cellular process, here apoptosis. Several different but similar templates are used for other modifications of case control facts, observational fact, or other fact types.

Figure 5:
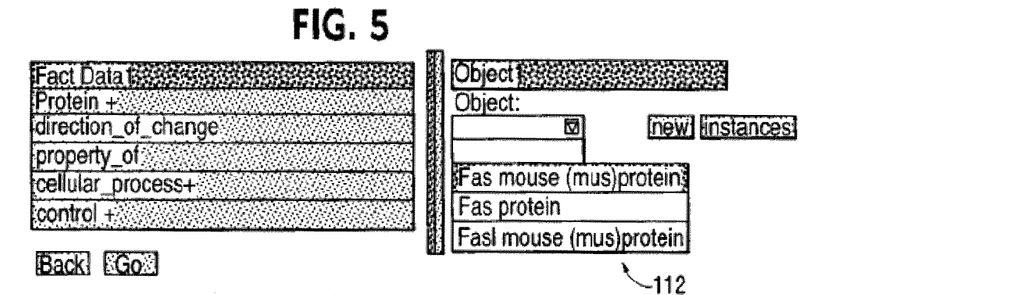
FIG. 5 illustrates a second set of selection menus for the fact type of FIG. 3.

The initial basic information that is entered into the fact type template automatically dictates the next frame that will be shown to the scientist to capture all details of a given fact. In this particular example, as shown in FIG. 5, the scientist is prompted to provide further information on the protein involved. The scientist is first provided with a text box 112 that allows entry of a few letters of the effector name (in the example given, the scientist could type an F, fas, mus, etc.) and possible exact matches will be presented in a drop down list. As shown in FIG. 5, the appropriate selection in this example is Fas mouse (mus) protein.

In each series of frames the scientist is presented with text boxes and associated pull-down menus, which offer constrained choices for entering the main components of the fact-properties, objects and their associated details, as defined by the KRS. As an alternative to pull-down menus, the user could be presented with a type-in field. In this embodiment, the user input would be checked against a predefined list of information choices acceptable to the fact type. In still another embodiment, a user could be presented with icons for selecting valid field values.

The next step in this example is to enter any details associated with the Fas mouse protein. Access to additional menus for specified details of an object is enabled by clicking on a "details" button.

Figure 6:
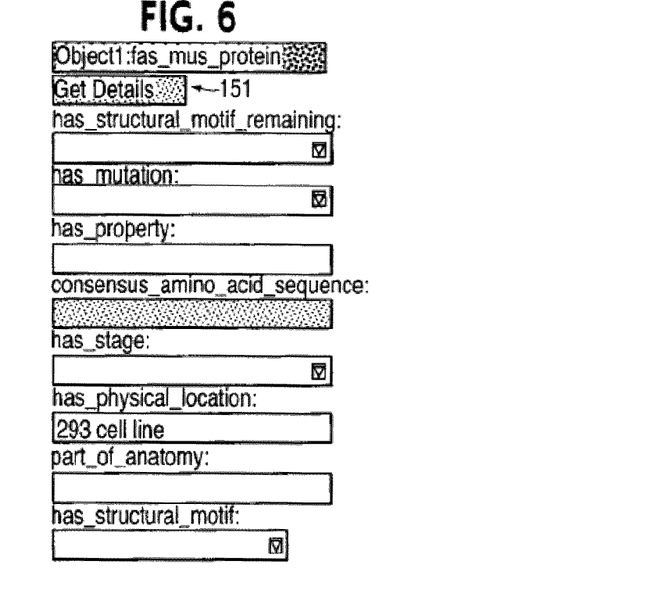
FIG. 6 illustrates yet another menu for entry of the fact type of FIG. 3.

In this example, there is one detail to enter, the instance that Fas was in a specified location (293 cells) while inducing apoptosis. As shown in FIG. 6, pressing the "get details" button 151 automatically brings up a drop down list of constrained terms from the KRS for the scientist to choose from. From the presented drop down list, the scientist would select "293 cell line" in the "has_physical_location" box to specify the exact object involved. This process is continued to capture all the details associated with the given fact. In this example, details include the direction of change (an increase), the fact that this change occurred in a dose dependent manner and the particular cellular process, apoptosis, occurred in 293 cells. Thus, as illustrated in this example, by presenting the scientist with a set of fact templates that are comprised of a constrained representation of fact types, restricted language choices and only appropriate selection menus which are fully consistent with the architecture and dictionary of the KRS, various embodiments ensure that information is structured in a way that is consistent with the hierarchical organization and controlled vocabulary of the KRS.

Figure 7:
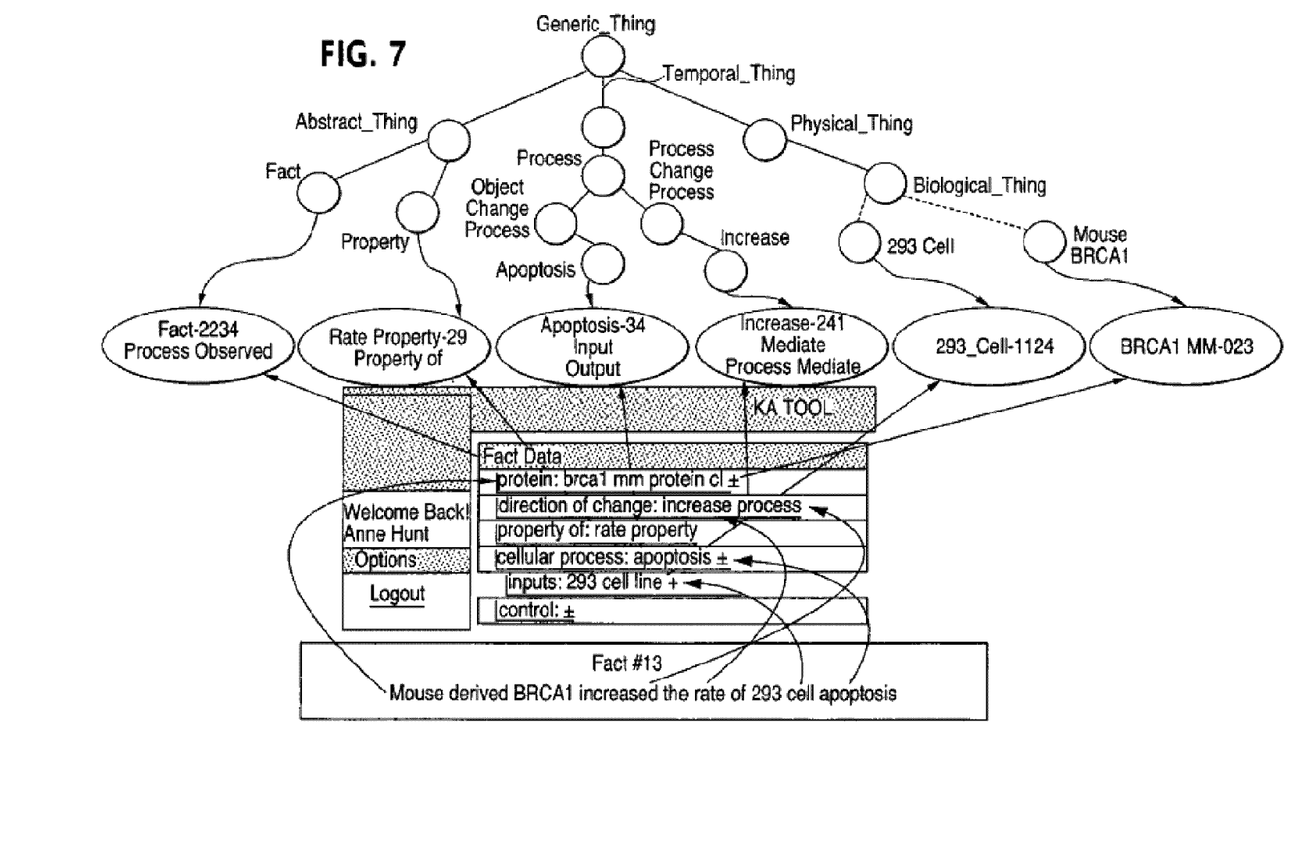
FIG. 7 illustrates how information in the template maps to the KRS structure.

FIG. 7 is an illustration of how a completed fact template maps graphically to the data architecture of the KRS.

For those situations when new concepts and terms not already represented in the KRS are discovered and must be represented in the KRS, a new item slot is made available within the template for the user to insert the new term. The new item slot appears when the term is not presented in the templates or if the term, after being typed into a text box, is not recognized by the KRS. Entries made into the new item slot are automatically flagged and later evaluated by KEs for incorporation within the KRS.

The use of the fact templates allows various embodiments to acquire knowledge for the KRS that is structured completely in accordance with instances already within the KRS, to express distinct types of experimental propositions in distinct fact structures, to ascribe standardized meanings for each component of the sentences of text-based information to be incorporated with the KRS, to utilize absolutely consistent terminology and to utilize concepts at distinct but interrelated levels of abstraction. As scientists can with relative ease acquire the skill to complete these templates and as the information in a properly completed template can be readily incorporated into the KRS to generate a populated KB, the KB can be expanded very rapidly, with only occasional intervention by the KEs when new concepts and terms are found.

Various embodiments' methods for rapidly populating a KRS, although described in the particular field of genomics, can be readily applied to all fields wherein the body of knowledge is rapidly growing. Possible other fields of knowledge where various embodiments could be applied to organize that knowledge are geology, particularly information relating to potential oilfield structure, as this generally comprises huge data sets, meteorology and ecology. This list of alternative fields of knowledge is not intended to be exclusive.

Figure 8:
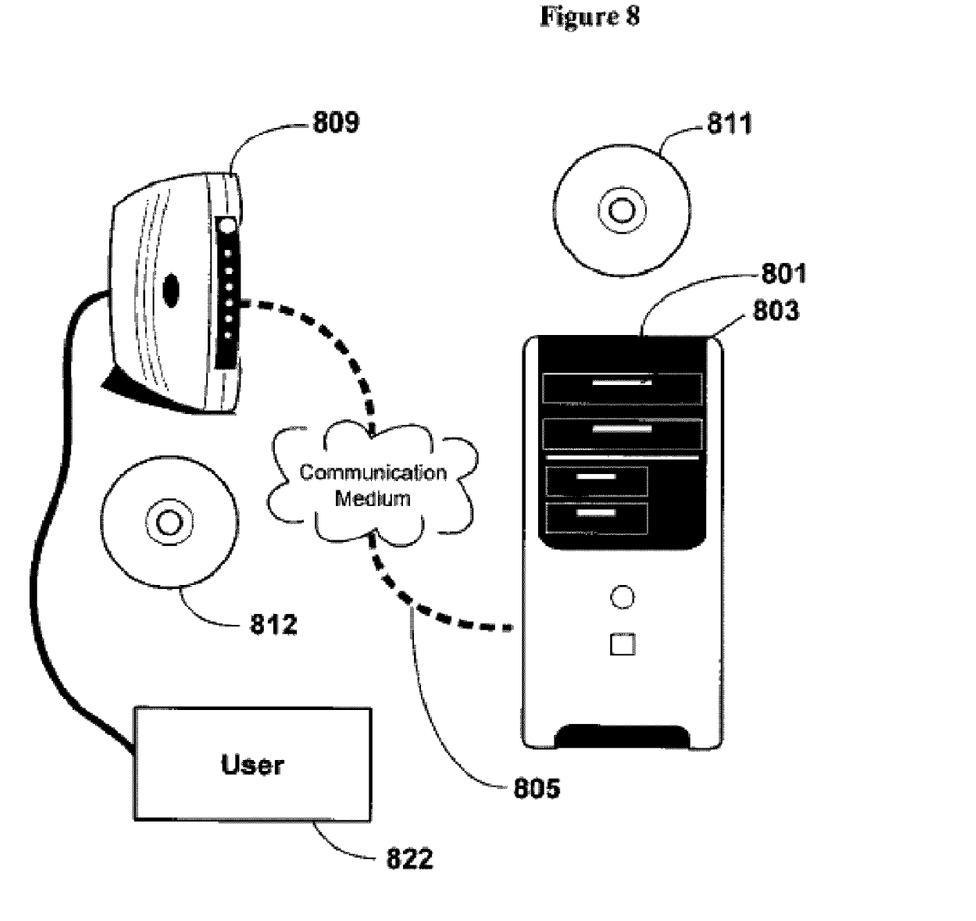
FIG. 8 illustrates a schematic of a computer system that can be used to construct, maintain, query and populate a knowledge representation system.

As shown in FIG. 8, some embodiments include code on a computer readable medium. The computer readable medium can be one or a combination of memory 803, processor 801, hard disk, CD 811, DVD 812, floppy, and/or carrier wave traveling a wired and/or wireless network 805, etc.

What is claimed is:

1. Fact templates for use in a Knowledge Representation System (KRS) on a non-transitory computer readable storage medium, comprising:

at least one fact-type specific fact template, each fact-type specific fact template accepting one predefined fact type found in predetermined information sources, wherein the template is capable of translating the fact type from one of a text-based, graphical and tabular language into a computational information language of the KRS; and the at least one fact-type specific fact template having at least one user interface that constrains user data entry to one of a predetermined set of valid user entries that may be inserted into the fact template at the user interface;

wherein the user interface includes a user entry field that permits entry of new information not included in the predetermined set of valid user entries and wherein information entered into the user entry field automatically flags the completed fact template for review.

2. The fact templates of claim 1 wherein scientists expert in the field defined by the predetermined information sources are enabled to extract information from the predetermined information sources and complete the templates with the extracted information.

3. The fact templates of claim 1, wherein the KRS is modified to accept the new information if the fact template passes review.

4. A frame-based Knowledge Representation System (KRS) on a non-transitory computer readable storage medium, populated with facts, the facts having been entered into the system by the step of:

completing at least one fact-type specific fact template, each fact-type specific fact template accepting one predefined fact type found in predetermined information sources, wherein the at least one fact-type specific fact template comprises at least one user interface that constrains user data entry to one of a predetermined set of valid user entries that may be inserted into the fact template at the user interface, and wherein the user interface includes a user entry field that permits entry of new information not included in the predetermined set of valid user entries;

transferring a plurality of structured facts from completed fact templates into the KRS to form a knowledge base, the structured facts being derived from natural language information sources;

wherein the KRS is an ontology having varying levels of abstraction of biological concepts and the structured facts correspond to one or more of the varying levels of abstraction of biological concepts and wherein information entered into the user entry field automatically flags the completed fact template for review.

5. The KRS of claim 4, wherein the natural language information sources comprise at least one of text-based and symbolic biological information sources.

6. The KRS of claim 4, wherein the fact templates structure and constrain a fact extracted from the information sources according to a user interface that constrains user data entry based upon a set of valid entries consistent with the structure and content of the ontology.

7. The KRS of claim 6, wherein the user interface includes a blank menu option, the blank menu option permitting the input of a new information choice not offered by the set of valid user entries.

8. The KRS of claim 7, wherein all completed templates in which a blank menu option was selected are reviewed prior to transferring the fact and the ontology is modified to accept the new information choice if a reviewer of the fact approves the new information choice.

9. The KRS of claim 8, wherein the templates are completed by experts knowledgeable in the field represented by the ontology and the review of new information choices is conducted by the experts and knowledge base engineers.

10. The KRS of claim 4, wherein the ontology is modified to accept the new information if the fact template passes review.

* * * * *